UNITED STATES PATENT OFFICE.

WILSON GLOVER, OF GREENVILLE, SOUTH CAROLINA.

BALE-COVERING.

SPECIFICATION forming part of Letters Patent No. 431,048, dated July 1, 1890.

Application filed September 2, 1889. Serial No. 322,797. (No model.)

*To all whom it may concern:*

Be it known that I, WILSON GLOVER, a citizen of the United States, residing at Greenville, in the county of Greenville and State of South Carolina, have invented certain new and useful Improvements in Bale-Coverings; and I do declare the following to be a full, clear, and exact description of the invention, such as will enable others skilled in the art to which it appertains to make and use the same.

My invention relates to a certain new and useful improvement in coverings for bales.

The object of the invention is to obtain a covering of the character named which will be uninflammable and weather-proof, which will present a good marking-surface, and in the use of which samples of the contents of the bale may be readily obtained.

To that end the invention consists in a covering made of salt-water marsh-grass, (*Spartina*,) used alone or held in place by suitable bands or by wire-netting; or the covering may be made by plaiting or platting the grass with and into the meshes of the wire-netting. In the formation of such coverings the salt-water marsh-grass is first cured by exposure to the sun and air, being kept dry while undergoing the process of curing. When cured the grass is plaited or platted into any desired width and length, this plaiting or platting being done by any suitable machinery, or it may be braided by hand. A covering made of this grass in the manner described will be found to be practically uninflammable and weather-proof, and will present a smooth and apparently-glazed surface, which forms a perfect marking-surface. Where a covering is made entirely of this grass in the manner described, the bale may be banded around said covering with iron or rope bands; or such covering may be applied as an inner jacket in connection with a wire-netting, such as is described in an application filed by me on the 17th day of December, 1888, Serial No. 293,810, in which latter case the meshes of such netting are to be so arranged as to permit of sampling the contents of the bale, as fully described in such application; or as a substitute for this covering, united with a separate netting for the protection thereof, the covering may be formed by plaiting the grass with and into the meshes of the wire-netting.

What I claim is—

1. As a new article of manufacture, a covering for bales, which consists of salt-water marsh-grass (*Spartina*) suitably cured and plaited or platted, as described.

2. As a new article of manufacture, a covering for bales, which consists of salt-water marsh-grass (*Spartina*) and wire-netting, the grass plaited with and into the meshes of the netting, as set forth.

In testimony whereof I affix my signature in presence of two witnesses.

WILSON GLOVER.

Witnesses:
 A. H. JENKINS,
 T. C. STUART,